M. P. RYDER.
GENERATOR OF INTERMITTENT ELECTRIC CURRENTS.
APPLICATION FILED JAN. 3, 1906.
1,062,361.
Patented May 20, 1913.
2 SHEETS—SHEET 1.
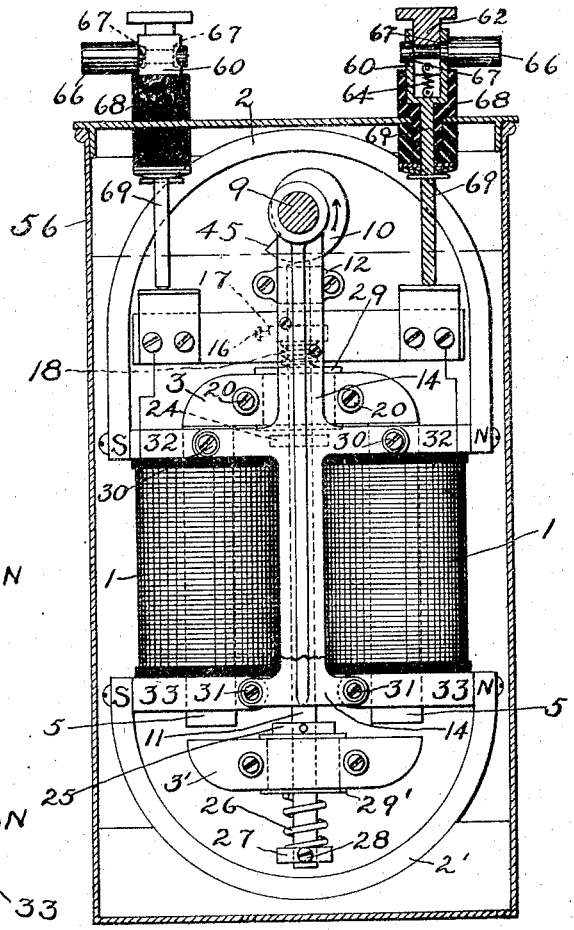
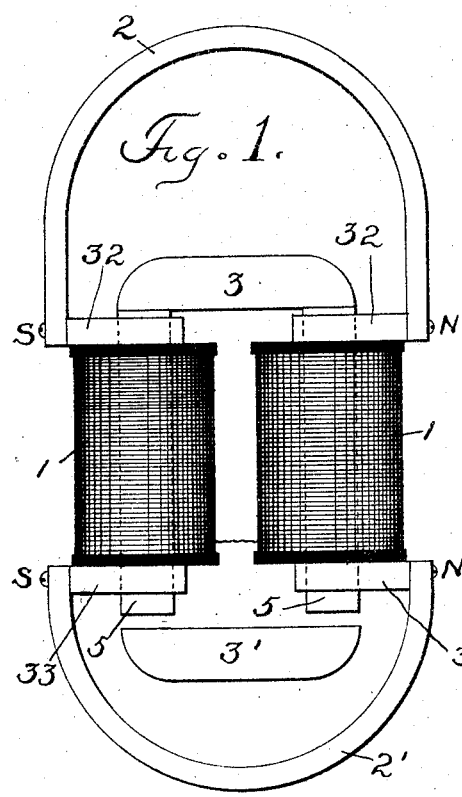
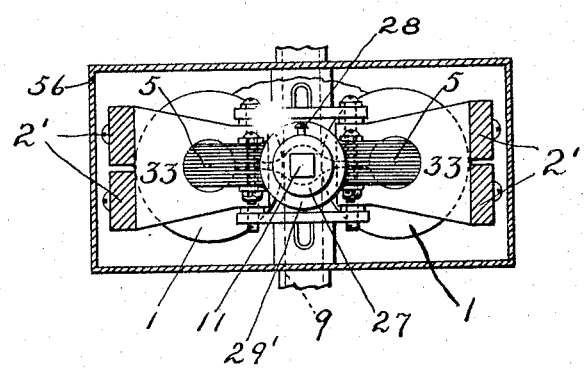
WITNESSES:
C. H. Tischner Jr.
Lillian Blond
INVENTOR
Malcolm P. Ryder.
BY
Townsend & Decker
ATTORNEYS

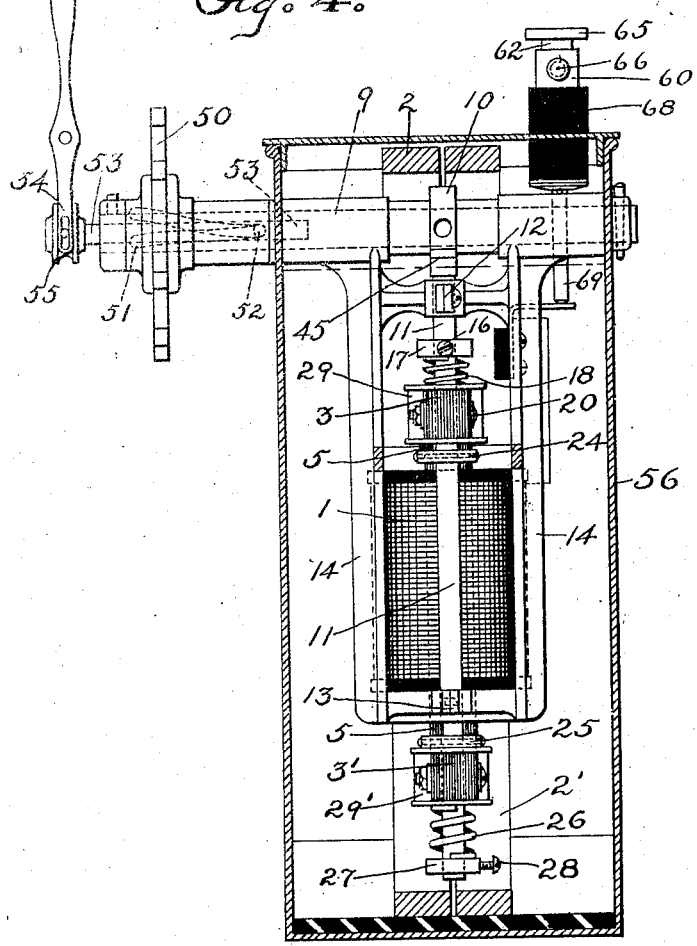

UNITED STATES PATENT OFFICE.

MALCOLM P. RYDER, OF WHITE PLAINS, NEW YORK.

GENERATOR OF INTERMITTENT ELECTRIC CURRENTS.

1,062,361.  Specification of Letters Patent.  Patented May 20, 1913.

Application filed January 3, 1906. Serial No. 294,380.

*To all whom it may concern:*

Be it known that I, MALCOLM P. RYDER, a citizen of the United States, and a resident of White Plains, in the county of Westchester and State of New York, with post-office address 1 Highland avenue, have invented certain new and useful Improvements in Generators of Intermittent Electric Currents, of which the following is a specification.

My invention relates to apparatus for generating intermittent electric currents through changes in the magnetic flux through a generating coil, said changes being produced by the movement of a mass or masses of magnetic material, such as iron, and which will, for convenience, hereinafter be termed "an armature or armatures."

The object of my invention is to produce a high-voltage current with a small number of turns of wire by employing generating coils combined with two sources of magnetic flux adapted respectively to produce flux in opposite directions through said coils, and combining with them armatures coöperating to interrupt and shunt the magnetic flux, as hereinafter set forth.

My invention consists further in the special combinations of generating coils, sources of magnetic flux and an armature or armatures combined and operating as hereinafter more particularly described and then specified in the claims.

In carrying out my invention, the sources of magnetic flux consists preferably of permanent magnets, but I do not limit myself to the use of any particular source of magnetic flux. When permanent magnets are employed, my invention is also useful in preventing reduction of the strength of said magnets from changes in their magnetic condition. This result is effected through so combining the magnets and armatures that changes in the magnetic reluctance between the poles of the magnet are prevented.

In the accompanying drawings, Figure 1 represents in diagrammatic fashion a combination of coils, magnets and armatures whereby my invention may be practised. Fig. 2 is a front elevation of a form of apparatus embodying my invention and shows details of mounting and of construction of devices for securing movement of the armatures that may be conveniently employed. Fig. 3 is an end view of said apparatus, the permanent magnets being shown in section. Fig. 4 is a side elevation with one of the set of coils, its core and core terminal block being removed.

Referring to Fig. 1, the generating coils are indicated at 1 and consist preferably of two spools or sets or coils connected up to one another. 2, 2' indicate respectively permanent magnets or sets of permanent magnets connected respectively to the cores for said coils in such way that they may respectively produce magnetic flux through said coils in opposite directions. The relative polarities of the poles for said permanent magnets are indicated by the letters N. S. Magnetic connection with the cores may be by blocks of iron 32, 33 secured to the core ends and to the poles of the permanent magnets in any suitable way. Connection between the permanent magnets and the cores may be made in any other desired way without departing from my invention. 3, 3' indicate respectively armatures adapted to reciprocate to and from the cores and into and out of contact with the same. If the armature 3 be in contact with the cores and the armature 3' out of contact, it will be obvious that the magnetic flux from the magnet 2' through the cores in one direction will be established, but that the magnetic flux of the magnet 2 will be shunted from said cores. If now the armature 3 be suddenly withdrawn, the shunt established by said armature for the flux from magnet 2 will be broken and if the flux from magnet 2' be withdrawn, the flux from the magnet 2' can flow through said coils in the opposite direction to that which flows through them from the magnet or magnets 2', thus producing a sudden change of magnetic flux from magnetism in one direction through zero to the magnetism in the opposite direction with a consequent generation of a momentary current of high potential in the coils 1. To assist in the withdrawal of the flux through the coils from magnet 2', produced by the break of magnetic circuit of said magnet when the armature 3 recedes, the armature 3' may be moved up to the cores 5 at the time that the armature 3 is withdrawn from the opposite end of said cores. Said armature 3' has a two-fold effect in this movement, since it not only conspires with armature 3 in stopping or reducing the flux from the source 2' by shunting said flux from the circuit through the coils coincidently with the interruption of the flux produced by armature 3, but also establishes a free path through which the magnetic flux from the magnet 2 may pass through said coils in the opposite direction. This combined or coöperating movement of the two armatures whereby they shall conspire in producing the desired sudden change or reversal, may be produced by any desired mechanism, but preferably by mechanism such as described in my prior application for patent filed Aug. 12, 1904, S. N. 220,467. It will be obvious that upon a reverse movement of the two armatures together, a reversal of magnetic flux will be produced again and back to the original condition, the armature 3' then performing the function assigned to armature 3 in the description of operation just given, while armature 3 acts as did the armature 3', the only difference being that the flux through the coils is established from magnet 2' instead of from magnet 2. While the combined or coöperating action of the armature may be secured by a reciprocating mechanism such as will be now described adapted to produce a sudden or violent detachment or change of position of one armature only, as for instance, armature 3, the principles of my invention may obviously be carried out by mechanism which would secure the same violent or sudden movement of both armatures in their movement away from the cores of the magnet.

Referring to Figs. 2, 3, 4 and 5, 56 indicates a casing within which is suitably mounted the parts of the apparatus. Reciprocation of the armatures is produced by a reciprocating rod 11 working in cross heads or cross bars of a frame 14. Said rod is actuated by means of a cam 10 secured on rotary shaft 9 driven by any means. Said cam engages with the upper end of the rod and forces the same down against the action of springs to be presently described. When the shoulder 45 of the cam passes the end of the rod, the springs are released and the rod suddenly rises, carrying with it the armatures 3, 3'. As the cam continues its rotation, it forces the rod down again carrying the armatures in a reverse direction. Armature 3 consists preferably of laminated iron, the laminations of which are fastened together by screws 20 between the heads of a spool 29 through which the rod 11 may move freely. Rigidly secured to the rod 11 is a collar 24 adapted to engage the armature on the spool 29 from beneath, when the rod rises. Interposed between the top of said armature and a collar 17 adjustably fastened to the rod by set screw 16, is a spring 18 which is compressed by the action of the cam 10 on the rod. Armature 3 may be similarly constructed and secured to a spool 29' through which the rod passes loosely. Between the under side of the spool 29' and a collar 27 adjustably secured to the rod by screw 28 is a second spring 26. A collar 25 fastened to the rod 11 limits the upward movement of the armature 3' on said rod under the action of spring 26 and serves as a means for positively moving the armature away from the cores when the rod is depressed. The cores for the coils may be also laminated and fastened in split blocks of iron 32 and 33 at opposite ends of the coils by means of the screws 30, 31 which clamp the split end of the block upon the cores. To the outer ends of the blocks 32 33 the poles of the magnets 2, 2' are fastened by screws or otherwise and said magnets themselves may be secured or supported in wooden blocks within the case in any suitable manner. The bearings for the reciprocating rod 11 are indicated at 12 and 13. Each source of magnetic flux is shown as comprising two permanent magnets, although obviously a greater or less number might be employed for each source.

The operation of the mechanism combined with the two armatures and the two sources of magnetic flux would be as follows: the moving parts being in the position shown in Fig. 2. The flux of magnet 2 is shunted from the coils by armature 3 but the flux from magnet 2' flows in a circuit through the coils and through said armature. When the rod 11 is released by the cam, spring 18 which is under compression moves the rod upward suddenly and the collar 24 detaches the armature 3 while the armature 3' is carried up by the rod into contact with the opposite ends of the cores 5. The result is that the shunt for the flux of magnets 2 around the coils is suddenly broken, while at the same time the circuit for the flux of magnet 2' by way of said armature 3 is also broken and the magnet 2 is now able to produce the magnetic flux in said coils in the opposite direction to that formerly produced by magnet 2'. Its action in establishing such reversal of magnetic flux is assisted by the armature 3' which not only establishes a path for said flux at the opposite end of the cores, but also removes any opposition to the change of flux from that established by magnet 2' by shunting the magnetic flux of said magnet 2' from the coils. As the reversal of magnetic flux takes place in a very short time, a sudden impulse of current is generated in the coils 1. The sudden reversal of magnetic flux thus produced by the coöperative action of the armatures makes it possible to secure with a given number of turns of wire a much greater voltage than can be secured by simply reducing the magnetic flux to zero by the movement of an armature as in the previous construction or combination of armatures, generating coils and sources of magnetic flux described in my prior application before referred to. As the rod 11 moves downward under the action of the cam, it reverses the movements of the two armatures and brings armature 3 again into contact with the cores, while it detaches armature 3'. This movement being a rather gradual movement, will not, of course, produce a current of such high potential as is produced when the rod is released. As will be obvious, the magnetic circuit of each magnet is closed at all times and hence the magnetic reluctance will not vary so as to produce injurious fluctuations in the strength of the magnets with a consequent gradual deterioration of the permanent magnetism.

When the apparatus is used for generating the igniting spark in internal combustion engines the shaft 9 may be driven by a sprocket wheel 50 or other wheel geared to the engine shaft. In such case, I use the following timing mechanism to permit the time of the spark to be changed: Shaft 9 is provided with an inclined slot 51 extending preferably through said shaft and through said slot projects a pin or key 52 which engages a longitudinally extending key way or groove within the hub of the wheel 50. Said pin is carried by a rod 53 which rotates with but slides axially within the hollow shaft 9 and is axially adjusted by means of a pivoted yoke 54 that engages the groove in a sleeve 55 fixed to and rotating freely with the rod. As will be obvious, axial movement of the rod changes the angular relation of the wheel 50 to the shaft 9 and so varies the time of the spark with relation to the cycle of action of the engine which drives the wheel 50. The yoke 54 is operated manually as in the case of any spark timing device for gasolene engines. A binding post and tip specially adapted to prevent accidental disconnections of the tip comprises a metallic shell 60 having a transverse perforation as shown and a spring actuated pin or rod 62 having a similar transverse perforation or opening adapted to be brought into registry with the transverse perforations or openings in the shell. To the pin or rod 62 is connected a spring 64 within the shell which tends to draw the pin down. The said pin may however be raised by its head to bring its opening into registry with the openings in the shell for the purpose of permitting the insertion of the contact pin or tip 66. The latter is turned down to provide the two shoulders indicated at 67. After the tip has been inserted and the pin or rod 62 released, said pin settles down upon the reduced portion of the tip and the shoulders on the latter prevent its withdrawal by engaging with the pin or rod 62. The shell 60 may be fastened within an insulating bushing 68 by means of the rod 69 extending from said shell down through the insulation of the bushing. Electrical connection with the binding post may be made through said rod which, as indicated, rests upon the terminal for the wire forming the coil.

What I claim as my invention is:

1. In a generator of electric currents, the combination of generating coils and cores therefor, two sources of magnetic flux adapted respectively to produce flux in opposite directions through the coils and two reciprocating armatures each adapted to be moved into and out of contact with the core so as to close and break a magnetic shunt circuit around the coils for one source and a magnetic circuit through the coils for the other source, said armatures acting in coöperation alternately, each to close a magnetic circuit through the coils and a shunt circuit around them during the breaking action of the other.

2. In a generator of intermittent electric currents, the combination with a coil and its core, of two sources of magnetic flux adapted respectively to produce flux in opposite directions through said coil and a reciprocating armature adapted to move into and out of contact with the core and means for detaching it from the core to simultaneously break a magnetic circuit of one source through the coil and a magnetic shunt for the other source around the coil.

3. The combination with two sets of generating coils and their cores, of two permanent magnets adapted respectively to produce a magnetic flux through said coils in opposite directions and two reciprocating armatures adapted to engage and be disengaged from contact with said cores and coöperating to change the flux, each being adapted on disengagement to break a magnetic shunt for one of the permanent magnets around the coils and at the same time break the magnetic circuit for the other permanent magnet through the coils, while the other armature is engaging to establish the magnetic circuit for the permanent magnet whose shunt is broken and at the same time close a magnetic shunt for the magnet whose circuit through the coils is broken.

4. The combination with a generating coil and core therefor, of two permanent magnets adapted respectively to produce a magnetic flux through said core in opposite directions, a reciprocating armature adapted in one position to engage the core and close the magnetic circuit for one permanent magnet through the coil and establish a magnetic shunt for the other permanent magnet around said coil and in the other position to be disengaged or out of contact with the core so as to break said shunt and circuit, and a coöperating armature adapted to close a shunt and a magnetic circuit for said permanent magnets respectively during the breaking of shunt and magnetic circuit by the first armature.

Signed at New York in the county of New York and State of New York this 22d day of December A. D. 1905.

MALCOLM P. RYDER.

Witnesses:
C. T. TISCHNER, Jr.,
LILLIAN BLOND.

Copies of this patent may be obtained for five cents each, by addressing the "Commissioner of Patents Washington, D. C."